United States Patent [19]

Traverso et al.

[11] Patent Number: 5,280,051
[45] Date of Patent: Jan. 18, 1994

[54] COMPOSITION FOR THE PRODUCTION OF ARTIFICIAL MARBLE OR GRANITE

[75] Inventors: Enrico Traverso, Monza; Fiorenzo Renzi, Gorgonzola, both of Italy

[73] Assignee: Enichem Synthesis S.p.A., Palermo, Italy

[21] Appl. No.: 811,078

[22] Filed: Dec. 20, 1991

[30] Foreign Application Priority Data

Dec. 21, 1990 [IT] Italy .................. 22479 A/90

[51] Int. Cl.$^5$ .................................................. C08K 3/10
[52] U.S. Cl. ........................................ 523/171; 264/73; 264/122; 428/15; 524/437; 524/449; 524/451
[58] Field of Search ................. 523/171, 500; 526/230.51, 232; 428/15; 264/109, 122, 331.18, 71, 72, 73, 77, 101, 245; 524/449, 451, 437

[56] References Cited

U.S. PATENT DOCUMENTS

| | | | |
|---|---|---|---|
| 3,417,172 | 12/1968 | Rostoker | 264/122 |
| 3,450,808 | 6/1969 | Roberts | 264/122 |
| 3,670,060 | 6/1972 | Cuffaro et al. | 264/122 |
| 4,473,673 | 9/1984 | Williams et al. | 428/15 |
| 4,643,921 | 2/1987 | Terabe et al. | 428/15 |
| 4,812,545 | 3/1989 | Renzi et al. | 264/1.1 |
| 4,966,794 | 10/1990 | Hasegawa et al. | 264/331.18 |
| 5,079,279 | 1/1992 | Hayashi et al. | 523/500 |

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

Artificial marble or granite having excellent aesthetic properties, patterns and tonalities which cannot be found in natural materials are prepared from a composition containing a polymerizable poly(allyl carbonate) of a polyol and mineral filler, where the mineral filler is a carbonate type in the case of marble, and silicate or silica type in the case of granite, and is in the form of particles of which at least 40% to 100% by weight have a particle size greater than 0.5 mm. The artificial marble and granite produced by the process of the invention require a limited quantity of polymerizable poly(allyl carbonate) binder, have excellent aesthetic properties and high aging resistance, making them suitable for external use.

26 Claims, No Drawings

COMPOSITION FOR THE PRODUCTION OF ARTIFICIAL MARBLE OR GRANITE

BACKGROUND OF THE INVENTION

1. Field of the Invention

The present invention relates to a composition for the production of artificial marble or granite. The invention also relates to a procedure for transforming this composition into artificial marble or granite and to the artificial marble and granite thus obtained.

2. Description of the Background

Articial marble and granite in block or panel form, generally composed of a mineral filler dispersed in a polymer matrix, are already known in the art, and are described, for example, in U.S. Pat. No. 4.698.010, DE 2.054.168 and Italian patent 1.056.388. A polyester resin or a polymethyl methacrylate are generally used for the purpose, mixed with the inorganic filler and the mixture is subjected to hardening after undergoing compaction. Unfortunately when a polyester resin is used, the product cannot be used externally because of its limited aging resistance, especially when exposed to UV radiation, whereas when a polymethyl methacrylate is used, the disadvantages are basically due to the use of a volatile and toxic polimerizable monomer.

Artificial marble composed of the product of the polymerization of a poly(allyl carbonate) has also been described in the art. In particular, in Japanese Patent Application 61-111-953 an artificial marble is described, composed of the polymerization product of a poly(allyl carbonate) of a polyol containing, as a mineral filler, a fine silica or hydrated alumina powder. In particular, the particle size of the mineral filler varies from 1 to 30 $\mu$m, preferably from 5 to 20 $\mu$m. Japanese Patent Application 63-237.989 describes a composition for the production of artificial marble composed of a bis(allyl carbonate), containing an oligomer of a di- or tri-hydroxylic alcohol, and an inorganic filler. In particular, the inorganic filler is in the form of particles of 1 to 30 $\mu$m in size, preferably from 5 to 10 $\mu$m. Japanese Patent Application 63-246.660 describes an artificial marble including a resinous binder and a balloon-shaped inorganic filler, where the inorganic filler is in the form of particles of 10 to 100 $\mu$m in size. Finally, Italian Patent Application 19.814 A/90, filed on Mar. 23, 1990, in the name of the Applicant, describes an artificial marble with improved coloring and scratch resistance, composed of the polymerization of a poly(allyl carbonate) of a polyol containing cristobalite as the mineral filler. In particular, the particle size of the mineral filler varies from 1 to 200 $\mu$m, preferably from 2 to 50 $\mu$m. This artificial marble with a poly(allyl carbonate) binder, has an improved aging resistance. However, high quantities of organic binder are required, making the procedure costly and consequently hindering the commercial development of the product.

SUMMARY OF THE INVENTION

It has now been found, in accordance with this invention, that by using a gross mineral filler of the carbonate kind, in the case of marble, and of the silicate or silica kind, in the case of granite, combined with a polymerizable bis(allyl carbonate), compositions are obtained which can be easily transformed into marble and granite, with excellent aesthetical properties and using a limited quantity of organic binder.

In compliance with this, this invention relates firstly to a composition for producing artificial marble or granite containing a liquid and polymerizable poly(allyl carbonate) binder of a polyol and a mineral filler, this composition being characterized by the fact that:

the mineral filler is of the carbonate kind, in the case of marble, or of the silicate or silica kind, in the case of granite, the carbonate, silicate or silica mineral filler is in the form of particles of which at least 40% to 100% by weight have a particle size which is higher than 0.5 mm;

the polymerizable poly(allyl carbonate) binder of a polyol is present in quantities of from 4 to 30 parts by weight for every 100 parts by weight of the sum of said poly(allyl carbonate) and mineral filler.

DESCRIPTION OF THE PREFERRED EMBODIMENTS

In accordance with a preferred method, at least 50% to 80% by weight of the mineral filler is composed of particles of more than 0.5 mm in size, the remaining percentage being made up of particles of less than 0.5 mm in size, and preferably particles having a size ranging from 1 to 500 $\mu$m. These finer particles should be of the same kind or different from the grosser particles. The maximum size of the grosser particles is not of vital importance and can reach values of 10–20 cm, as, for example, in the production of breccia marble. However, in the preferred method the particle size of the gross filler does not exceed 20 mm.

In accordance with a preferred method, the polymerizable poly(allyl carbonate) is present in the composition in quantities of from 6 to 20 parts by weight for every 100 parts by weight of the sum of said poly(allyl carbonate) and mineral filler. Very good results have been obtained by using quantities of as little as 7–8 parts by weight of polymerizable poly(allyl carbonate) for every 100 parts by weight of the sum of said poly(allyl carbonate) and mineral filler.

Useful fillers for the purpose of this invention are carbonate, silicate or silica mineral fillers. Examples of these are natural marble, granite and silica sand. The finest mineral filler may also be composed of finely ground natural marble, granite or silica sand and/or other materials such as hydrated alumina, talc, silicas, graphite, mica or their mixtures.

The fine mineral filler can be partially substituted (up to 50% by weight) by either long or short glass fibre. These fine mineral fillers and glass fibres have the function of filling the interstices between the gross fillers in the final conglomerate, and of consequently giving compaction and mechanical resistance to the resulting material at the end of the process. Some fillers also have a special function, as in the case of hydrated alumina, for example, Which, as is wellknown, is that of making the material in which it is contained, flame resistant.

In particular it has been found that the higher the particle size of the gross mineral filler, especially in the case of artificial granite, the better the resulting material, at the end of the process, will resemble ordinary granite.

Both fine and gross mineral fillers can be pre-treated with compatibilizing agents of the silane group, such as gamma-methacryloxy propyl triethoxy silane, vinyl triethoxy silane and trimethyl silane. These compatibilizing agents have the effect of closely binding the organic matrix to the mineral filler, creating a more compact and continuous structure in the artificial marble and granite, with a consequent further improvement in their mechanical characteristics.

The polymerizable poly(allyl carbonate) of a polyol, which is suitable for the purposes of this invention, is generally composed of at least one poly(allyl carbonate) of a polyol containing from 2 to 6 hydroxyl groups in the molecule, in the form of a monomer and/or oligomer.

Poly(allyl carbonates) of polyols, suitable for the purposes of this invention, can, for example, be selected from:
bis(allyl carbonates) of diols such as ethylene glycol, propylene glycol, diethylene glycol, dipropylene glycol, triethylene glycol, tetraethylene glycol, pentanediol, hexanediol, dimethanol cyclohexane, neopentyl glycol and dimethanol tricyclo decane;
tris(allyl carbonates) of triols such as glycerol, trimethylolpropane and tris (hydroxyethyl)isocyanurate;
tetra(allyl carbonate) of pentaerythritol;
hexa(allyl carbonate) of dipentaerythritol.

Mixed poly(allyl carbonates), containing radicals of one or more different polyols in the same molecule, may also be used.

In one of the preferred methods, the (polyallyl carbonate) of the polyol is bis(allyl carbonate) of the diethylene glycol monomer, having the following formula:

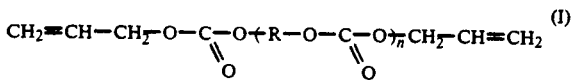

where R is the diethylene glycol radical and n=1.

Compound (I) can be prepared by reacting diethyleneglycol bis(chloroformate) with allylic alcohol, as described for example in the "Encyclopedia of Chemical Technology", Kirk-Othmer, III Ed., Vol. 2, pages 111–112.

In another preferred method, the poly(allyl carbonate) of the polyol is a mixture of bis(allyl carbonate) of diethylene glycol monomer [n=1 in formula (I)] with one or more oligomers of bis(allyl carbonate) of diethylene glycol [n from 2 to 10 in formula (I)]. In particular monomer/oligomer mixtures containing from 20 to 90% by weight of monomer can be used.

These mixtures can be prepared simply and practically by means of a transesterification reaction between diallyl carbonate and diethylene glycol, operating in the presence of a basic catalyst, as described for example in European Patent 35.304.

In another preferred method, the poly(allyl carbonate) of the polyol is a mixture of:
bis(allyl carbonate) of diethylene glycol monomer;
bis(allyl carbonate) of diethylene glycol oligomer (as defined above); and
tris (allyl carbonate) of tris (hydroxyethyl) isocyanurate.

This mixture will preferably contain from 10 to 50% of the first component; from 20 to 70% of the second component; and from 5 to 60% by weight of the third component. The third component may be partially oligomeric (for example up to 50% by weight).

Polymerizable mixtures having this composition are described for example in U.S. Pat. No. 4.812.545.

In accordance with another preferred method, the poly(allyl carbonate) of the polyol is the product of the transesterification of a mixture of diallyl carbonate, diethylene glycol and tris (hydroxyethyl) isocyanurate, as described for example in the publication of European Patent Application 302.537.

In another preferred method the poly(allyl carbonate) of the polyol is a mixture of:
bis(allyl carbonate) of diethylene glycol monomer;
bis(allyl carbonate) of diethylene glycol oligomer (as defined above); and
tetra (allyl carbonate) of pentaerythritol.

This mixture will preferably contain from 10 to 50% of the first component; from 20 to 70% of the second component; and from 5 to 50% by weight of the third component. The third component may be partially oligomeric.

In another preferred method, the poly(allyl carbonate) of the polyol is obtained by the transesterification of a mixture of diallyl carbonate, ethylene glycol and pentaerythritol, as described for example in the publication of European Patent Application 302.537.

In accordance with another preferred method, the poly(allyl carbonate) of a polyol may be partially substituted (up to a maximum of 40% by weight) by a monofunctional vinyl or (meth)acrylic monomer, such as vinyl acetate, vinyl versatate and methyl methacrylate.

In another preferred method, the poly(allyl carbonate) of the polyol is a mixture of:
bis-(allyl carbonate) of the neopentyl glycol monomer;
bis-(allyl carbonate) of the neopentyl glycol oligomer, defined in the same way as diethylene glycol;
tris-(allyl carbonate) of tris-(hydroxyethyl)isocyanurate, The above mixture will preferably contain from 10 to 70% of the first component; from 20 to 70% of the second component; from 5 to 60% of the third component.

The third component may be partially oligomeric.

In accordance with another preferred method, the poly(allyl carbonate) of the polyol is obtained by means of the transesterification of a mixture of diallylcarbonate, neopentylglycol and tris(hydroxyethyl)-isocyanurate.

The composition for producing artificial marble or granite of the present invention contains, in addition, a polymerization initiator of poly(allyl carbonate) of a polyol, which is normally selected from peroxides and azo-compounds. For this purpose, it is preferable to use a percarbonate, especially dicyclohexyl peroxy-dicarbonate or diisopropyl peroxy-dicarbonate. The quantity of initiator varies from 1 to 10% by weight, and preferably from 3 to 7% by weight, with respect to the weight of the poly(allyl carbonate) of the polyol.

The composition for producing artificial marble or granite of this invention can also contain, additionally, limited quantities of one or more silanes as a substitute of or in addition to those which may be deposited on the mineral filler. Other additives which may be incorporated in the mixture in limited quantities are: dispersers and wetting agents of the mineral fillers, deaerating agents, viscosity lowering agents, antisettling agents, internal release agents (especially of the silicone kind) to facilitate the detachment of the product from the mould, titanium bioxide and organic or preferably inorganic coloured dyes, either organic or inorganic flame retarding agents, metallic dyes and/or flakes, organic or inorganic pearly dyes and/or lamellae, stabilizers in general, such as UV absorbers of the hydroxy-benzophenone and benzotriazole groups and/or UV stabilizers such as sterically hindered amines (HALS).

The UV absorbers are preferably hydroxybenzophenones such as:

CHIMASSORB 90 (from CIBA): 2-hydroxy-4-methoxybenzophenone

CHIMASSORB 81 (from CIBA): 2-hydroxy-4-octoxybenzophenone.

The HALS-type UV stabilizers are agents which scavenge the initial promoter radicals of radicalic decomposition of the polymer, and are preferably derivatives in position 4- of 2,2,6,6-tetramethylpiperidine.

The aminic group of the piperidinic ring may be of the secondary or tertiary type (substituted by a methyl, for example).

These HALS stabilizers, moreover, may be non-reactive additives in the monomeric mixture, or they may be reactive and be chemically inserted in the polymeric chain during the polymerization of the mixture.

Some non-limiting examples of these HALS stabilizers are:

TINUVIN 770 (from CIBA)
  Bis-(2,2,6,6-tetramethyl-4-piperidinyl)-sebacate
TINUVIN 292 (from CIBA)
  Bis-(1,2,2,6,6-pentamethyl-4-piperidinyl)-sebacate
UVASIL 299 (from ENICHEM SYNTHESIS)
  Poly-methylpropyl-3-oxy-[4-(2,2,6,6-tetramethyl)-piperidinyl]siloxane
2,2,6,6-tetramethyl-4-piperidinyl-acrylate.

Both the hydroxybenzophenone and the HALS derivatives may be added singly as alternatives respectively, in quantities of between 0.01 and 2% and preferably between 0.1 and 1.5% with respect to the catalyzed monomeric mixture; or both types of product may be used together in a total quantity of between 0.02 and 3%, and preferably between 0.2 and 2% with respect to the catalyzed monomeric mixture.

The second case is preferable in that both products together produce a synergetic stabilizing effect.

Another aspect of the present invention relates to a procedure for the preparation of artificial marble or granite, comprising:

(a) the preparation of the composition for producing artificial marble or granite by mixing the ingredients;
(b) pouring the composition into a mould and its compaction, operating under vacuum to exclude any occluded air;
(c) the polymerization of the polymerizable organic matrix, by means of a suitable thermal cycle, to obtain a slab or block, and
(d) finishing the slab or block thus obtained.

In particular, stage (a) can be carried out in a normal planetary mixer for heterogeneous mixtures in the open air. In stage (b), the mould can be treated with a release agent, preferably of the silicone type, or protected with a sheet of polyethylene, polyvinylchloride or any other suitable material. The mould will have the shape of a flat slab or parallelepiped block, and can be put under vacuum to allow the evacuation of interstitial air during or after compaction. The latter may be carried out by shaking or vibration. Stage (c) can be carried out directly inside, or also outside the mould, when the damp panel covered with the protective sheet has become self-consistent and can be extracted from the mould. Suitable thermal cycles for the polymerization of the poly(allyl carbonate) of the polyol can be at a temperature ranging from 40° to 100° C. (for example 1 hour at 60° C., 1.5 hours at 70° C. and 1 hour at 80° C.) or under isothermal conditions at 50°-60° C. (for example 8 hours at 60° C.). During polymerization, the surfaces of the block or panel are not in contact with the air to prevent the inhibiting effect of oxygen on the radicalic polymerization. Finally, stage (d) may include operations such as the cutting and sizing of the slabs or blocks and their polishing. In particular, in the case of artificial granite, the cutting can be carried out with diamond-pointed tools, and the polishing with abrasive elements based on silicon or boron carbide.

The procedure described above is particularly advantageous when low quantities of polymerizable poly(allyl carbonate) of a polyol are used, in particular quantities of less than 10% by weight, i.e. just sufficient to wet the mineral filler. In particular, the compaction in stage (b), which can be carried out using the known techniques, operating under vacuum and with vibro-compression for short periods of time (for example 60 seconds), allows for the extraction of a slightly wet and self-consistent slab with a plastic consistency, which can be easily handled before the polymerization of the poly(allyl carbonate) of the polyol.

The artificial marble and granite, comprising a further aspect of the present invention, have excellent aesthetical properties, with patterns and chromatic tonalities which cannot be found in natural materials, and have various advantages with respect to products already known in the art. In particular, compared to similar marble and granite based on polyester resins, they have:

a better aesthetical aspect of the polished surfaces; these surfaces are in fact shining and not yellowish and have a lesser "orange-peel" effect, a better thermal resistance, particularly to cigarette burns, a better resistance to chemical agents, solvents and staining in general, and a much better external aging-resistance, especially to UV radiation.

Even if this improved aging-resistance of the marble and granite of the present invention compared to those based on polyester resins, is already quite evident when the respective formulations do not contain light stabilizers, it becomes even more so when hydroxybenzophenone and HALS UV light stabilizers, described previously, are present.

The experiment was carried out by exposing the test samples, having a flat, smooth surface, to accelerated aging in the following two apparatus:

ATLAS Ci 65 Weatherometer
  Equipped with a 6500 Watt Xenon lamp.
  Relative humidity 50%
  Temperature of the black panel: 60° C.
  Exposure cycle: continuous irradiation
  Exposure time: 2000 hours.

UV-CON ATLAS
  Equipped with a FS 40 fluorescent lamp.
  Exposure cycle: luminous irradiation, for 8 hours at 60° C., then darkness for 4 hours, at 40° C., with abundant condensed moisture on the surface of the samples.
  Exposure time: 1000 hours.

Exposure in the second apparatus is more drastic compared to that in the first.

Evaluation consisted of measuring the difference in colour of the samples from the beginning to the end of exposure; the evaluation parameters are deduced from the tristimulus colorimetry, and in particular the following values were determined:

$\Delta E^*$: total variation in colour

ΔC*: variation in colour excluding the variation in lightness.

The following conclusions may be drawn from the general results of the evaluation after exposure of the samples to accelerated aging:

samples without light stabilizers
samples in accordance with the present invention: slight whitening (increase in lightness), slight variation in colour (ΔC*).
samples based on polyester resins:
  strong chromatic variation (ΔE* and ΔC*), and in particular considerable yellowing, and considerable surface chromatic variability (yellowish marbling).
samples with light stabilizers (hydroxybenzophenones+HALS):
  samples in accordance with the present invention: very slight whitening, insignificant variation in colour (ΔC*)
  samples based on polyester resins: strong variation in colour (ΔE* and ΔC*), in particular yellowing, surface chromatic disuniformity.

The mechanical resistances of the artificial marble and granite of the present invention are almost the same as those of similar products composed of polyester resin and 2-3 times higher than those of the corresponding natural material which provides the mineral filler with a grosser particle size. For example, the ultimate flexural stress of the present artificial marble and granite is 400-700 kg/cm², whereas that of the corresponding natural material is 150-250 kg/cm².

Compared with the artificial marble prepared with the procedure already known in the art, which uses a polymerizable poly(allyl carbonate), the artificial marble and granite of the present invention have a different kind of aesthetical effect and are much more economical owing to the small quantities of polymerizable poly(allyl carbonate) required for their production. This possibility of using such low quantities of polymerizable poly(allyl carbonate), in accordance with the present invention, is due to the use of a grosser filler, which offers a smaller wettable area, together with the excellent wetting characteristics of the polymerizable poly(allyl carbonates) used. It is however equally surprising that products with such high mechanical characteristics can be obtained with such low quantities of organic binder.

The invention is further illustrated by the following experimental examples.

EXAMPLES

In these examples, PRODUCTS A, B, C and D are used as polymerizable poly(allyl carbonates), with the following compositions and characteristics:

PRODUCT A

Liquid product of the transesterification between diallyl carbonate and diethylene glycol, in a molar ratio between them of 12/1. This product is definable with formula (I) specified above, where: R is the diethylene glycol radical, and where the monomer and the oligomers have the following percentage distribution by weight: 88.3% (n=1), 10.5% (n=2), 1.1% (n=3), 0.1% (n=4). This product also has a density of 1.15 g/ml at 20° C. and a viscosity of 14 c.stokes at 25° C.

PRODUCT B

Liquid product composed of a mixture of:

37% by weight of PRODUCT A described above;
37% by weight of the product of the transesterification between diallyl carbonate and diethylene glycol in a molar ratio between them of 2/1, definable with formula (I) specified above, with the following distribution between monomer and oligomers: 33.9% (n=1), 25.1% (n=2), 16.6% (n=3), 10.2% (n=4), 14.2% (n>4);
26% by weight of tris (allyl carbonate) of tris (hydroxyethyl) isocyanurate, which is the transesterification product between diallyl carbonate and tris (hydroxyethyl) isocyanurate, in a molar ratio between them of 12/1, and consisting of 75% by weight of monomer and 25% by weight of oligomers. PRODUCT B has a density of 1.209 g/ml at 20° C. and a viscosity of 81 c.stokes at 25° C.

PRODUCT C

Liquid product composed of a mixture of:
24% by weight of PRODUCT A described above;
24% by weight of the product of the transesterification between diallyl carbonate and diethylene glycol in a molar ratio between them of 2/1, with the same distribution between monomer and oligomers as described for PRODUCT B;
52% by weight of tris (allyl carbonate) of tris (hydroxyethyl) isocyanurate, which is the transesterification product between diallyl carbonate and tris (hydroxyethyl) isocyanurate, in a molar ratio between them of 12/1, and consisting of 75% by weight of monomer and 25% by weight of oligomers. PRODUCT C has a viscosity of 320 c.stokes at 25° C.

PRODUCT D

Liquid product composed of a mixture of monomer and oligomers deriving from the transesterification reaction between diallyl carbonate and a mixture of diethylene glycol and pentaerythritol in a weight ratio between them of 70/30, with a molar ratio between the diallyl carbonate and the sum of the polyols of 5/1.

PRODUCT D has a density of 1.190 g/ml at 20° C. and a viscosity of 90 c.stokes at 25° C.

PRODUCT E

Liquid product composed of a mixture of monomers and oligomers deriving from the transesterification reaction between diallylcarbonate and a mixture of neopentyl glycol and tris-(hydroxyethyl)isocyanurate in a weight ratio of 50/50, with a molar ratio between the diallylcarbonate and the sum of the polyols of 5/1.

Product E has a density of 1.184 g/ml at 20° C. and a viscosity of 320 c.stocks at 25° C.

EXAMPLE 1

1,000 g of Serizzo Formazza granite, with the following particle size distribution:
60% by weight: 1-4 mm,
20% by weight: 0.1-1 mm,
20% by weight: 5-100 um (for more than 95%),
are mixed with a solution composed of 165.9 g of PRODUCT A and 10.6 g (6% by weight) of dicyclohexylpercarbonate, for 0.5 hours in a 2 liter polyethylene beaker, inclined and rotating at a low speed.

The mixture obtained is filled into a flat, open, steel mould, with dimensions of 30×15 cm and a height of 2 cm, protected with a thin sheet of high density polyethylene.

The mould is subjected for 0.5 hours to vibration of medium frequency using a manual vibrator and subsequently, after placing it on an ultra-sound plate, to high frequency vibrations for 0.5 hours. In this way, the heterogeneous mass becomes compact, continuous and damp and any interstitial air bubbles are eliminated.

The mould is then placed in an oven, under forced vacuum, for 0.5 hours and subsequently under a nitrogen atmosphere and is subjected to the following thermal cycle:
1.5 hours at 60° C.,
1.5 hours at 70° C.,
1 hour at 80° C.

The resulting panel, which is compact and perfectly hardened, is removed from the mould, calibrated on both sides to a thickness of 12 mm, the edges trimmed with diamond-pointed tools and then polished on one side with a brush based on silicon carbide. This side is shiny with a slight "orange-peel" effect, and resembles commercial Serizzo Formazza granite which is continuous, flat and polished.

EXAMPLE 2

1,000 g of commercial Imperial Red granite from Sweden, with the following particle size distribution:
60% by weight: 1-5 mm,
20% by weight: 0.1-1 mm,
20% by weight; 5-100 μm (for more than 95%),
are mixed with a solution of 167.7 g of PRODUCT B and 8.8 g (5% by weight) of dicyclohexylpercarbonate, under the same conditions described for Example 1.

The resulting mixture is filled into a mould and subjected to vibration and polymerization using the same procedure as described for Example 1.

The resulting panel, which is compact and perfectly hardened, is calibrated to a thickness of 12 mm and polished on one side as in Example 1. This side is shiny, with a slight "orange-peel" effect, and resembles the original Imperial Red granite from Sweden, which is continuous, flat and polished.

EXAMPLE 3

1,000 g of commercial Imperial Red granite from Sweden, crushed as in Example 2, are mixed with 176.5 g of a mixture composed of 141.2 g (80% by weight) of PRODUCT B, 26.5 g (15% by weight) of vinyl versatate, the commercial product VEOVA-10 of Shell and 8.8 g (5% by weight) of dicyclohexylpercarbonate.

The mixture thus obtained is filled into a mould, subjected to vibration as described in Example 1 and polymerized with the following thermal cycle:
1 hour at 60° C.,
1 hour at 70° C.,
1 hour at 80° C.

The resulting panel, which is compact and perfectly hardened, is calibrated to a thickness of 12 mm, smoothed and polished as described in Example 1. The polished side resembles that of the panel in Example 2.

EXAMPLE 4

6 kg of white Carrara marble, with the following particle size distribution:
65% by weight: 0.5-1.5 mm,
15% by weight: 100-500 um,
20% by weight: 5-100 μm (for more than 95%),
are mixed with a solution composed of 1,007 g of PRODUCT B and 53 g (5% by weight) of dicyclohexylpercarbonate for 0.5 hours in a 10 liter polyethylene container, inclined and rotating at low speed.

The mixture thus obtained is charged into a parallelepiped steel box, the base of which is 20×15 cm and the internal walls treated with a silicone release agent. The box is subjected to medium and high frequency vibrations, operating under vacuum and is then placed in an oven, firstly under vacuum and subsequently under a nitrogen atmosphere, as described in Example 1. The following thermal cycle is used for the polymerization:
4 hours at 40° C.,
4 hours at 50° C.,
2 hours at 60° C.,
2 hours at 70° C.

The resulting block, having dimensions of 10×15×20 cm is removed by cutting the box. It is compact and perfectly hardened and is cut vertically into 1 cm thick slices. The surface of the cut is homogeneous: there are a few small bubbles. When this surface has been smoothed and polished, it is white; the speckled and "orange-peel" effect is hardly noticeable.

EXAMPLE 5

A sheet having dimensions of 30×30×1.4 cm is prepared starting from a mixture of:
3,600 g of white Carrara marble, with the same particle size distribution as specified in Example 4,
305 g of a solution composed of 286.7 g of PRODUCT D and 18.3 g (6% by weight) of dicyclohexylpercarbonate,
3 g of gamma-methacryl-oxypropyl-triethoxy-silane.

In particular, the mixing is carried out in an open-air planetary mixer. The mixture is stirred for 10 minutes. The resulting mixture which is in the form of an uncaked, sandy mass which is slightly wet, is charged into a flat, steel mould, protected with polyethylene paper. The mould is put under a vacuum of 10 mm Hg, and then to violent vibrocompression for 1 minute. The resulting panel which is continuous, compact, plastic and self-consistent, is removed from the mould and, still protected with the polyethylene paper, is polymerized between two aluminium plates heated by means of hot oil circulation, at 60° C. for 8 hours.

The resulting panel which is perfectly hardened, is then calibrated to a thickness of 1.4 cm, trimmed, smoothed and polished as described in Example 1. The polished side is white and shiny, with a slightly speckled and barely visible "orange-peel". The ultimate flexural stress of this material, determined with an Instron dynamometer(ASTM D-790), is 600 kg/cm$^2$.

A sample of the material obtained in the present Example, and a similar sample made with styrenated polyester resin having dimensions of 7×13 cm, are subjected to the accelerated aging test in a ATLAS Ci 65 Weather-O-Meter, with continuous irradiation from a 6,500 watt xenon lamp (relative humidity 50%, black panel temperature 60° C.). After 2,000 hours of testing, the sample obtained in accordance with the present Example is still perfectly white and has conserved 80% of its initial gloss, whereas the sample made with styrenated polyester resin after 500 hours has become extremely yellow and opaque.

EXAMPLE 6

A sheet having dimensions of 60×60×1.4 cm is prepared starting from a mixture of:
17 kg of partially ground silica sand, with the following particle size distribution:

60% by weight: 0.5–1.5 mm,
20% by weight: 100–500 um,
20% by weight: 5–100 μm (for more than 95%)
and 30 g of BAYFERROX 140M inorganic red dye (commercial product of Bayer), to which are added:
1,460 g of a solution composed of 1372.4 g of PRODUCT C and 87.6 g (6% by weight) of dicyclohexylpercarbonate, and
15 g of gamma-methacryl-oxypropyl-triethoxysilane.

In particular, the mixing is carried out in an open-air planetary mixer. The consistency of the mixed mass, the compaction of the panel with vibrocompression in a flat mould under vacuum and the consistency of the panel are similar to those of Example 5. The resulting panel, protected with polyethylene paper, is polymerized between two aluminium plates heated by means of hot oil circulation, with the following thermal cycle:
1 hour at 60° C.,
1.5 hours at 70° C.,
1 hour at 80° C.

The resulting panel which is perfectly hardened and compact, is then calibrated to a thickness of 1.4 cm, trimmed, smoothed and polished as described in Example 1. The polished side is ochre-red in colour, and has a speckled and barely visible "orange-peel" effect. The ultimate flexural strength of this material, determined with an Instrondynamometer ASTM D790), is 650 kg/cm$^2$.

EXAMPLES 7,8,9,10,11,12,13,14,15,16,17,18

These examples refer to the preparation of the corresponding slabs, with dimensions of 30×30×1.4 cm, from which the test samples having dimensions of 7×15×1.4 cm were taken and subjected to accelerated aging.

The slabs were prepared following the procedure of vibrocompression under vacuum and final mechanical finishing, as described in Examples 5 and 6.

As far as the composition of the slabs and polymerization cycle are concerned, it should be considered that:
the inorganic phase is composed of 92.5% of the total weight of the formulation, of only silica sand of the type which is described in Example 6, in Examples 7–16, and of 92.3% of the same silica sand and 0.2% of 140M Bayferrox Red dye in Examples 17 and 18.
the polymeric organic phase, which equals 7.5% of the total weight in all Examples, also includes the catalyst, light stabilizers and gamma-methacryloxy propyltriethoxysilane (1% by weight of the organic phase).
the monomeric mixture is composed of Product C in Examples 7, 10, 12, and of Product E in Examples 8, 14, 16, 17, and, as a comparison, of unsaturated orthophthalic polyester resin mixed with styrene (PES) (DISTITRON produced by DISTILLIRIE ITALIENE) in Examples 9, 11, 13, 15, 18. Products C and E are catalyzed with 5% by weight of dicyclohexylpercarbonate. The PES polyester product is catalyzed with 2% of methyl-ethylketoneperoxide and, 0.2% of an accelerator based on cobalt (Co 6%).
the polymerization is carried out at 60° C. for 8 hours in the case of the slabs based on Product C and Product E, and at 85° C. for 40 minutes in the case of the slabs based on PES.

the quantities of UV light stabilizers, shown in the table, are in weight % with respect to the organic phase.
The stabilizers used are:
TINUVIN 292 (CIBA)
  bis-(1,2,2,6,6-pentamethyl-4-piperidinyl)-sebacate
UVASIL 299 (ENICHEM SYNTHESIS)
  Poly-methylpropyl-3-oxy-(4-(2,2,6,6-tetramethyl)-piperidinyl)-siloxane.
HALS-Acrylate
  2,2,6,6-tetramethyl-4-piperidinyl-acrylate
CHIMASSORB 90 (CIBA)
  2-hydroxy-4-methoxy-benzophenone
CHIMASSORB 81 (CIBA)
  2-hydroxy-4-actoxy-benzophenone.

The samples were subjected to accelerated aging in the following two apparatus:
ATLAS Ci 65 Weatherometer
  Equipped with a 6500 Watt Xenon lamp.
  Relative humidity 50%
  Temperature of the black panel 60° C.
  Exposure cycle: continuous irradiation
  Exposure time: 2000 hours.
UV-CON ATLAS
  Equipped with a FS 40 fluorescent lamp Exposure cycle: light irradiation for 8 hours at 60° C., and then darkness for 4 hours at 40° C., with abundant condensed moisture on the surface of the samples.
  Exposure time: 1000 hours.

Evaluation was based on measuring the difference in colour of the samples from the beginning to the end of exposure; the evaluation parameters are taken from the tristimulus colorimetry, and in particular the following values were determined:
$\Delta E^*$: total variation in colour
$\Delta C^*$: variation in colour excluding the lightness parameter.

The quantitative results are shown in the Table.
As far as quality is concerned, the following conclusions can be drawn:
Samples based on Product C and Product E:
  Those without stabilizers show a slight whitening and slight variation in colour ($\Delta C^*$), samples 8 being better than samples 7.
  Samples with light stabilizers show a very slight whitening and insignificant variation in colour ($\Delta C^*$). In general, however, the chromatic variations ($\Delta E^*$ and $\Delta C^*$) of samples based on Product E are of a lesser degree than those based on Product C.
Samples based on polyester resin (PES).
  Those without stabilizers undergo considerable chromatic variation ($\Delta E^*$ and $\Delta C^*$) and in particular, considerable yellowing, and great surface chromatic variability (yellowish marbling).
  Samples with stabilizers have a significant variation in colour ($\Delta E^*$ and $\Delta C^*$), and in particular yellowing, and surface chromatic disuniformity.
  The final appearance of all samples, however, is much poorer than that of the corresponding samples based on Products C and E.

TABLE

| Test sample/example | 7 | 8 | 9 | 10 | 11 | 12 | 13 | 14 | 15 | 16 | 17[a] | 18[a] |
|---|---|---|---|---|---|---|---|---|---|---|---|---|
| Binder | C | E | PES | C | PES | C | PES | E | PES | E | E | PES |
| Chimassorb 90 | / | / | / | 0.5 | 0.5 | 0.5 | 0.5 | / | / | 0.5 | 0.5 | 0.5 |

TABLE-continued

| Test sample/example | 7 | 8 | 9 | 10 | 11 | 12 | 13 | 14 | 15 | 16 | 17[a] | 18[a] |
|---|---|---|---|---|---|---|---|---|---|---|---|---|
| Chimassorb 81 | / | / | / | / | / | / | / | 0.5 | 0.5 | / | / | / |
| Tinuvin 292 | / | / | / | / | / | 0.5 | 0.5 | / | / | / | / | / |
| Uvasil 299 | / | / | / | / | / | / | / | 0.5 | 0.5 | / | 0.5 | 0.5 |
| Hals_Acrylate | / | / | / | / | / | / | / | / | / | 0.3 | / | / |
| Wom 2000 hrs.: | | | | | | | | | | | | |
| ΔE* | 10 | 2.3 | 10.5 | 5 | 7 | 1.5 | 3.9 | 0.8 | 3.5 | 0.6 | 0.7 | 3.2 |
| ΔC* | 2.5 | 0.8 | 8.5 | 1 | 4.5 | 0.6 | 2.9 | 0.45 | 2.6 | 0.4 | 0.4 | 2.8 |
| UV-Con 1000 hrs.: | | | | | | | | | | | | |
| ΔE* | 8 | 2.7 | 11[b] | 5 | 7.5[b] | 1.8 | 4.5[b] | 0.9 | 3.8[b] | 0.7 | 0.6 | 3.8[a] |
| ΔC* | 3 | 0.9 | 8[b] | 1.5 | 5[b] | 0.7 | 3.4[b] | 0.5 | 3.3[b] | 0.3 | 0.35 | 2.7[a] |

[a]test samples are red as they contain 0.2% by weight of the pigment BAYFERROX 140 M
[b]the colour is highly heterogeneous

We claim:

1. A composition for producing artificial marble or granite, comprising:
   a) a liquid polymerizable poly(allyl carbonate), polyol having viscosity in centipoise in the range from 16.1–378.9, and
   b) a mineral filler, wherein said mineral filler is selected from the group consisting of carbonates, silicates and silica in the form of particles, wherein 40–100 wt. % of said particles have a particle size greater than 0.5 mm,
   said composition comprising 4–30 parts by weight of said polymerizable poly(allyl carbonate) polyol binder for every 100 parts by weight of the sum of said poly(allyl carbonate) binder and mineral filler.

2. The composition of claim 1, wherein said mineral filler is selected from the group consisting of natural marble, granite and silica sand.

3. The composition of claim 1, wherein said mineral filler comprises 50–80 wt. % of particles having a particle size greater than 0.5 mm.

4. The composition of claim 1, wherein said mineral filler comprises 50–80 wt. % particles having a particle size greater than 0.5 mm, the remaining particles having a particle size ranging from 1–500 microns.

5. The composition of claim 4, wherein said remaining particles are selected from the group consisting of hydrated alumina, talc, silicon, graphite, mica and mixtures thereof.

6. The composition of claim 4, wherein a portion of said remaining particles are glass fibers.

7. The composition of claim 1, wherein said mineral filler is pretreated with a silane compatibilizing agent.

8. The composition of claim 7, wherein said compatibilizing agent is selected from the group consisting of gamma-methacryloxy propyl triethoxy silane, vinyl triethoxy silane and trimethyl silane.

9. The composition of claim 1, wherein said polymerizable poly(allyl carbonate) polyol is a poly(allyl carbonate) of a polyol containing from 2–6 hydroxy groups, in the form of a monomer or oligomer.

10. The composition of claim 9, wherein said poly(allyl carbonate) polyol is selected from the group consisting of bis(allyl carbonate) of ethylene glycol, propylene glycol, diethylene glycol, dipropylene glycol, triethylene glycol, tetraethylene glycol, pentanediol, hexanediol, dimethanolcyclohexane, neopentyl glycol, dimethanol tricyclo decane; tris(allyl carbonates) of glycerol, trimethylolpropane and tris(hydroxyethyl)isocyanurate; tetra(allyl carbonate) of pentaerythritol; hexa(allyl carbonate) of dipentaerythritol; and mixtures thereof.

11. The composition of claim 9, wherein said poly(allyl carbonate) polyol has the formula

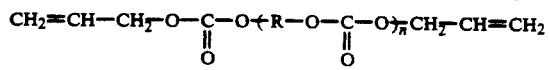

wherein R is a diethylene glycol group and n=1–10.

12. The composition of claim 9, wherein said poly(allyl carbonate) polyol is a mixture of the bis(allyl carbonate) of diethylene glycol monomer and an oligomer of bis(allyl carbonate) of diethylene glycol, wherein said mixture comprises 20–90 wt. % of said monomer.

13. The composition of claim 9, wherein said poly(allyl carbonate) polyol is a mixture of:
   1) 10–50 wt. % bis(allyl carbonate) of diethylene glycol monomer;
   2) 20–70 wt. % bis(allyl carbonate) of diethylene glycol oligomer; and
   3) 5–60 wt. % tris(allyl carbonate) of tris (hydroxyethyl) isocyanurate or an oligomer thereof.

14. The composition of claim 9, wherein said poly(allyl carbonate) polyol is the transesterification product of a mixture of diallyl carbonate, diethylene glycol and tris (hydroxyethyl) isocyanurate.

15. The composition of claim 9, wherein said poly(allyl carbonate) polyol is a mixture of:
   1) 10–50 wt. % bis(allyl carbonate) of diethylene glycol monomer;
   2) 20–70 wt. % bis(allyl carbonate) of diethylene glycol oligomer; and
   3) 5–60 wt. % tetra(allyl carbonate) of pentaerythritol, or an oligomer thereof.

16. The composition of claim 9, wherein said poly(allyl carbonate) polyol is the transesterification product of a mixture of diallyl carbonate, ethylene glycol and pentaerythritol.

17. The composition of claim 1, comprising 6–20 parts by weight of said poly(allyl carbonate) polyol for every 100 parts by weight of the sum of said poly(allyl carbonate) polyol and said mineral filler.

18. The composition of claim 1, comprising 7–8 parts by weight of said poly(allyl carbonate) polyol for every 100 parts by weight of the sum of said poly(allyl carbonate) polyol and said mineral filler.

19. The composition of claim 1, wherein said poly(allyl carbonate) polyol comprises up to 40 wt. % of a monofunctional vinyl or (meth)acrylic monomer.

20. The composition of claim 19, wherein said monofunctional vinyl or (meth)acrylic monomer is selected from the group consisting of vinyl acetate, vinyl versatate, and methyl methacrylate.

21. The composition of claim 1, further comprising a peroxide or azo polymerization initiator.

22. The composition of claim 21, comprising a percarbonate initiator.

23. The composition of claim 22, wherein said percarbonate initiator is dicyclohexyl peroxy dicarbonate or diisopropyl peroxy dicarbonate.

24. The composition of claim 21, comprising 1-10 wt. % initiator with respect to the weight of said poly(allyl carbonate) polyol.

25. The composition of claim 21, comprising 3-7 weight percent of said initiator with respect to the weight of said poly(allyl carbonate) polyol.

26. The composition of claim 1, further comprising at least one member selected from the group consisting of silanes, dispersants and wetting agents of the mineral fillers, deaerating agents, viscosity lowering agents, antisettling agents, internal release agents, titanium dioxide, dyes, flame retardants, UV absorbers and UV stabilizers.

* * * * *